United States Patent [19]

Matsuo

[11] Patent Number: 5,823,628
[45] Date of Patent: Oct. 20, 1998

[54] RETRACTOR ATTACHING STRUCTURE OF SEAT BELT FOR VEHICLE

[75] Inventor: Takashi Matsuo, Hamamatsu, Japan

[73] Assignee: Suzuki Motor Company, Shizuoka-ken, Japan

[21] Appl. No.: 815,565

[22] Filed: Mar. 12, 1997

[30] Foreign Application Priority Data

Oct. 21, 1996 [JP] Japan .................................. 8-276757

[51] Int. Cl.⁶ .................................................. A47C 31/00
[52] U.S. Cl. ........................... 297/475; 297/482; 280/807
[58] Field of Search .................................. 297/475, 474, 297/476, 478, 481, 482; 280/807

[56] References Cited

U.S. PATENT DOCUMENTS

| | | | |
|---|---|---|---|
| 4,582,274 | 4/1986 | Schlotterbeck et al. | 280/807 X |
| 4,621,836 | 11/1986 | Mori et al. | 297/475 X |
| 5,211,694 | 5/1993 | Sahakida et al. | 280/807 X |
| 5,397,152 | 3/1995 | Kawamura | 280/807 |

FOREIGN PATENT DOCUMENTS

| | | |
|---|---|---|
| 43 27 717 A | 2/1995 | Germany . |
| 1-317850 | 12/1989 | Japan . |
| 4-47009 | 4/1992 | Japan . |
| 6219241 | 8/1994 | Japan .................................. 280/807 |

Primary Examiner—Laurie K. Cranmer
Attorney, Agent, or Firm—Michael D. Rechtin; Edward A. Squillante, Jr.; Foley & Lardner

[57] ABSTRACT

A vehicle seat belt retractor attaching structure is constructed in such a manner that an inner panel is divided into at least two parts, the inner panels obtained by dividing the inner panel are used as upper and lower inner panels respectively, a bulged part is formed in the upper inner panel so as to be protruded into a car cabin from the lower inner panel and the seat belt retractor is fixed so as to be interposed between the bulged part of the upper inner panel and the lower inner panel.

3 Claims, 6 Drawing Sheets

5,823,628

RETRACTOR ATTACHING STRUCTURE OF SEAT BELT FOR VEHICLE

BACKGROUND OF THE INVENTION

The present invention relates to the retractor attaching structure of an automobile seat belt.

As disclosed in Japanese Unexamined Patent Publication No. 1-317850 and Utility Model Publication No. 4-47009, the retractor of an automobile seat belt is generally attached to the center pillar or the side sill of a car body by using bolts and nuts.

Referring to FIGS. 6 and 7, a retractor 1 is shown with its winding part omitted. This retractor 1 is first inserted between an outer panel 5 and an inner panel 8, and then the click part 8a of the inner panel 8, which faces the outer panel 5, is locked in the hole part 1c of the retractor 1. In this manner, the fixing bolt hole part 1b of the retractor 1 is aligned with the hole part 8b of the inner panel 8. Then, the retractor 1 is fixed to a car body by a fixing bolt 7 and a nut 8c which has been welded to the inner panel 8.

Referring to FIGS. 8 and 9, the retractor 1 is fixed to the car body by the fixing bolt 7 and the welded nut 8c of the inner panel 8, in the same manner as that shown in FIG. 6, after the click part 1a of the retractor 1 is locked in the hole part 8d of the inner panel 8 from the cabin side of the inner panel 8 and then the fixing bolt hole part 1b of the retractor 1 is aligned with the hole part 8b of the inner panel 8.

The fixing method described above by referring to FIGS. 6 and 7 is effective for preventing the rotation of the retractor 1 and positioning the same, because of locking of the click part 8a of the inner panel 8 facing the outer panel 5 side in the hole part 1c of the retractor 1. However, since the retractor 1 cannot be held by the click part 8a, an operator who attaches parts always needs to screw in the fixing bolt 7 while pressing the retractor 1.

In the case of the fixing method described above by referring to FIGS. 8 and 9, it is difficult to arrange this in a small car, because the retractor 1 is bulged on the inside of the inner panel 8 (dimension A in the drawing) and this reduces space in the cabin. In addition, since a pillar trim 9 is bulged in the cabin in a projected manner, an appearance is not good.

OBJECT AND SUMMARY OF THE INVENTION

It is an object of the present invention to provide a structure for fixing a retractor to a car body, which enables an operator to easily perform an attaching operation and the retractor to be easily attached even to a vehicle, for instance a small car, which does not have much space in the cabin.

In order to achieve its object, the present invention is characterized in that an inner panel is divided into at least two parts, the inner panels obtained by this division are respectively used as upper and lower inner panels, a bulged part, which protrudes from the lower inner panel into a car cabin, is formed in the upper inner panel and the retractor of a seat belt is fixed so as to be caught between the bulged part of the upper inner panel and the lower inner panel.

Since the retractor 1 of the seat belt is fixed so as to be caught between the bulged part 2a of the upper inner panel 2 and the lower inner panel 3 as described above, it is not necessary to hold the retractor 1 by hand during fixing of the retractor 1 by an attaching operator. Therefore, workability can be improved.

Also, since the retractor 1 is housed and fixed in a so-called dead space between an outer panel 5 and the inner panels 4, 2 and 3, the cabin space is not reduced because of the retractor 1. Therefore, the retractor 1 can be easily attached even to a small car, which has limited cabin space.

Furthermore, since it is not necessary to form a hole part to be used for the click part 1a of the retractor 1 in a car body side or a click part 8a conversely in the car body side, car body machining costs can be reduced and machining time is shortened.

DETAILED DESCRIPTION OF THE PREFERRED EMBODIMENT

Figure 1:
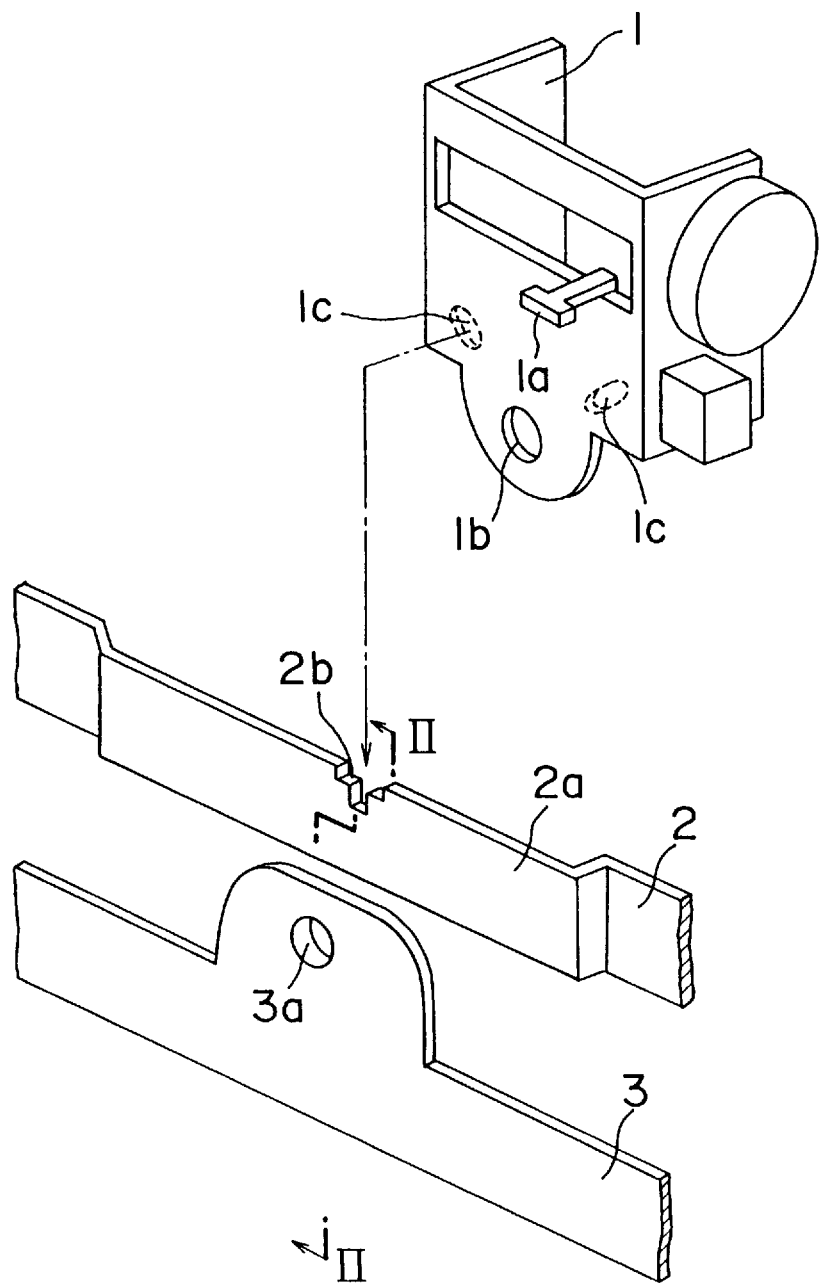
FIG. 1 is a perspective view showing a retractor and a lower inner panel before assembling.

An embodiment of the present invention will be described below with reference to the accompanying drawings.

Referring to FIGS. 1 to 5, a retractor 1 is a winding device for freely pulling out or winding a seat belt 6. The retractor 1 is attached to a center pillar, which is composed of an inner panel including a main inner panel 4, an upper inner panel 2 and a lower inner panel 3, and an outer panel 5. A bulged part 2a is provided in the upper inner panel 2 so as to be protruded to the inside of a car cabin and a recessed part 2b is provided in the upper end of the bulged part 2a. The lower inner panel 3 which has a hole part 3a is provided in the lower part of the upper inner panel 2. The pulled-out seat belt 6 is supported on the upper part of the center pillar, not shown.

Figure 2:
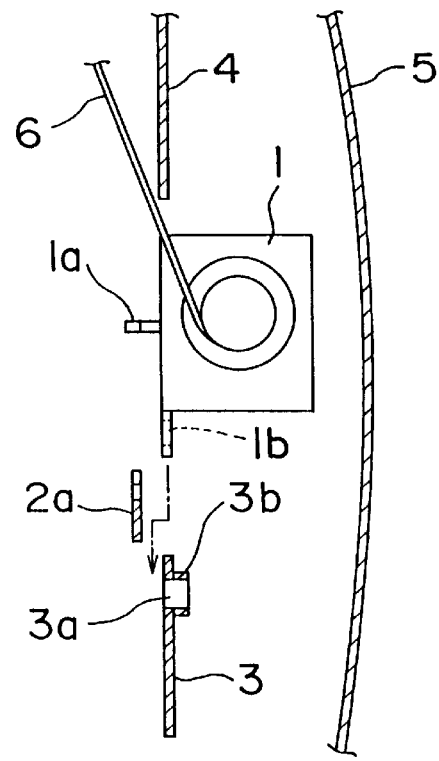
FIG. 2 is an exploded section view showing a first step for attaching a retractor to an inner panel.

Referring to FIG. 2, the retractor 1 is interposed between the bulged part 2a of the upper inner panel 2 and the outer panel 5 in order that the click part 1a of the retractor 1 may face the inside of the car room from between the main inner panel 4 and the upper inner panel 2 and a fixing bolt hole part 1b may face downward.

Figure 3:
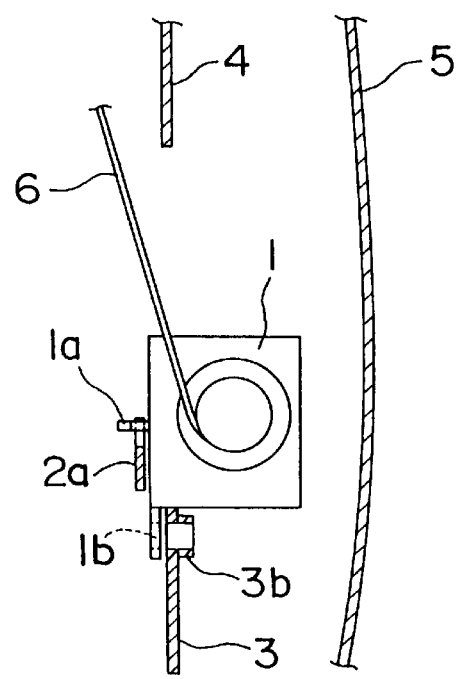
FIG. 3 is an exploded section view showing a second step for attaching the retractor to the inner panel.

Next, referring to FIG. 3, the retractor 1 is lowered until the click or pawl part 1a of the retractor 1 is engaged with a recessed part 2b, which is located in the bulged part 2a of the upper inner panel 2.

Figure 4:
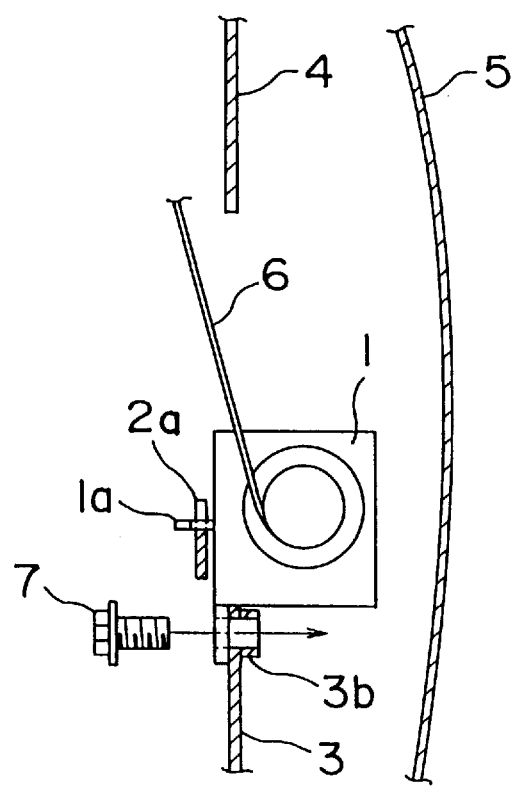
FIG. 4 is an exploded section view showing a third step for attaching the retractor to the inner panel.
Figure 5:
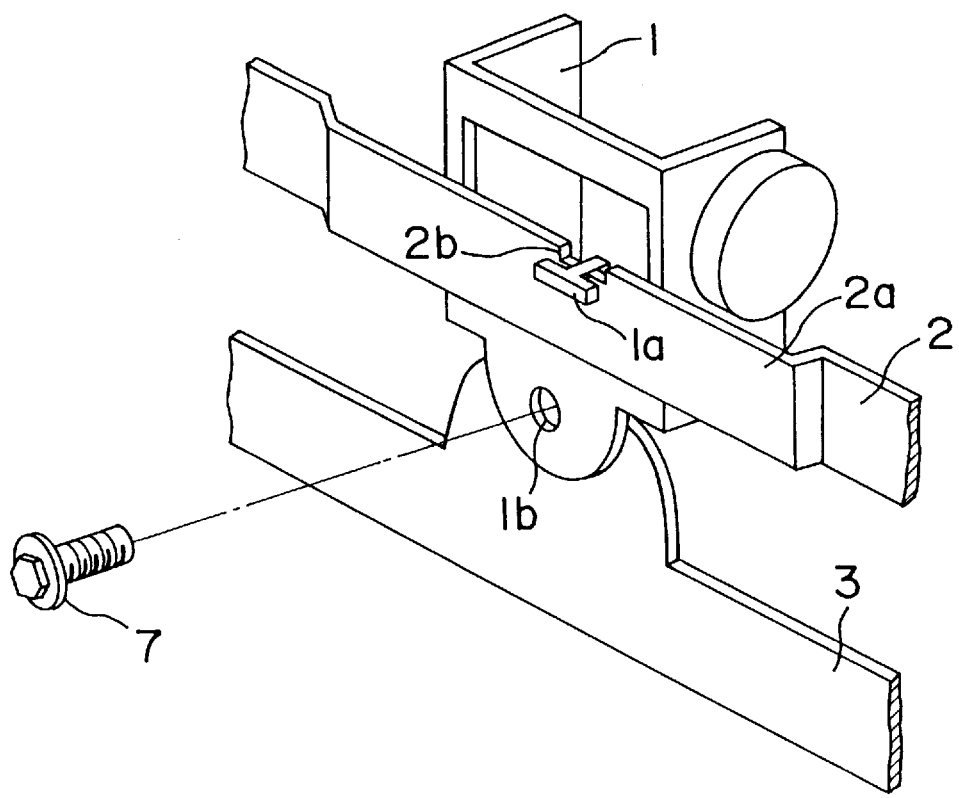
FIG. 5 is a perspective view showing a condition in which the retractor is assembled in the inner panel.
Figure 6:
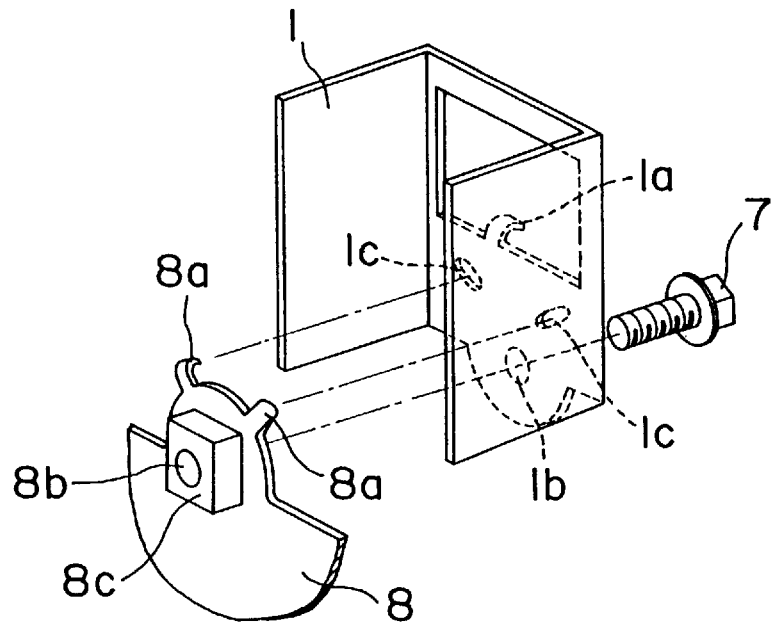
FIG. 6 is a perspective view showing a condition before a conventional seat belt retractor is assembled in an inner panel.
Figure 7:
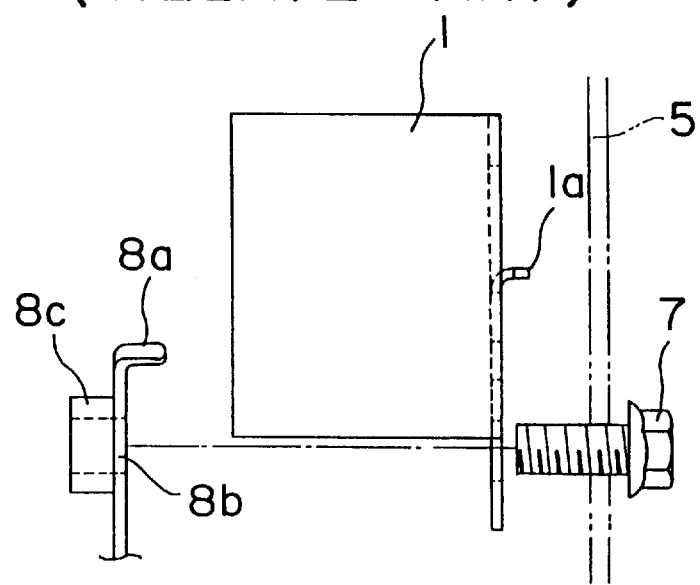
FIG. 7 is a side view of FIG. 6.
Figure 8:
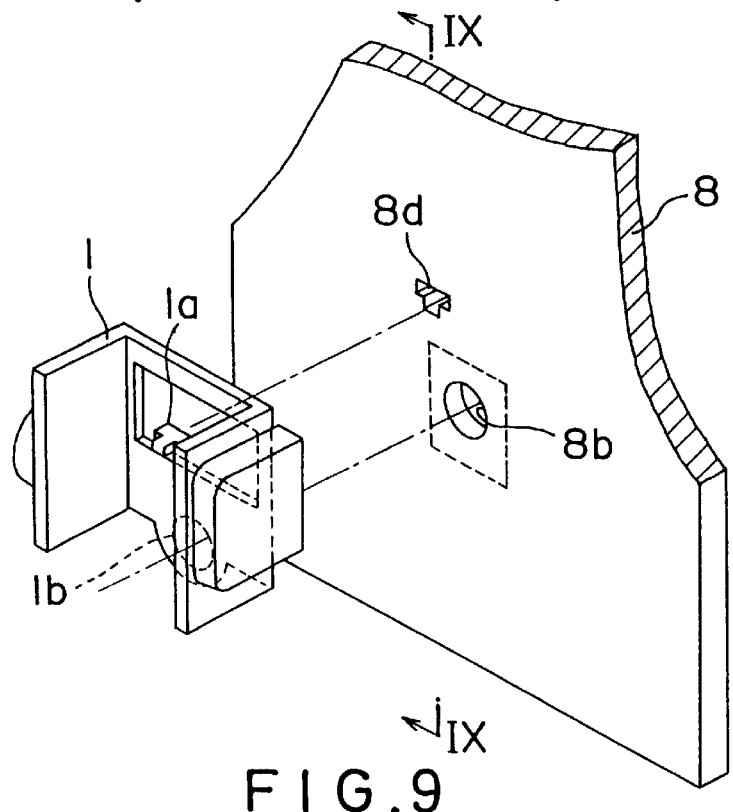
FIG. 8 is a perspective view of another conventional example, showing condition before a seat belt retractor is assembled in an inner panel.
Figure 9:
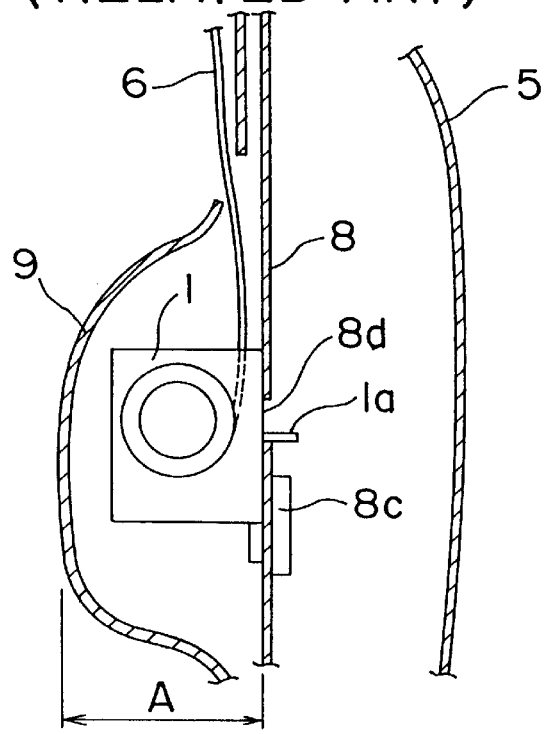
FIG. 9 is a section view taken along the line IX—IX of FIG. 8.

Referring to FIGS. 4 and 5, after the foregoing engagement has been completed, the fixing bolt hole part 1b of the retractor 1 is aligned with the hole part 3a of the lower inner panel 3, and the retractor 1 is fixed to the lower inner panel 3 by a fixing bolt 7 and the welded nut 3b of the lower inner panel 3.

The foregoing click part 1a can be formed to have a simple projected shape and the recessed part 2b can be omitted. In this case, positioning of the hole parts 1*b* and 3*a* in upper and lower directions is performed by the projected click or pawl part 1*a*. Aligning of the hole parts 1*b* and 3*a* in a horizontal direction can be performed by fine adjusting of the retractor 1, which has been interposed between the bulged part 2*a* of the upper inner panel and the lower inner panel 3.

By the foregoing steps, the retractor 1 is fixed to the center panel.

What is claimed is:

1. A vehicle seat belt retractor attaching structure for attaching a seat belt retractor to an inner panel of a vehicle body, said structure comprising: a seat belt retractor; an inner panel, which is divided into at least two parts, wherein at least an upper inner panel and a lower inner panel are obtained by division of said inner panel; and a bulged part which is provided on said upper inner panel so as to be protruded towards a vehicle cabin, wherein said seat belt retractor is fixed so as to be interposed between said upper inner panel bulged part and said lower inner panel.

2. The vehicle seat belt retractor attaching structure as claimed in claim 1, wherein a recessed part is provided at an upper end of said upper inner panel bulged part, a pawl part is provided in said seat belt retractor and said pawl part is locked in said recessed part.

3. The vehicle seat belt retractor attaching structure as claimed in claim 2, wherein said seat belt retractor is housed between said inner panel and an outer panel.

* * * * *

UNITED STATES PATENT AND TRADEMARK OFFICE
CERTIFICATE OF CORRECTION

PATENT NO. : 5,823,628
DATED : October 20, 1998
INVENTOR(S) : Takashi Matsuo

It is certified that error appears in the above-identified patent and that said Letters Patent is hereby corrected as shown below:

On the title page: Item [73] Assignee : delete "Company" and add --Corporation--.

Signed and Sealed this

Twenty-seventh Day of July, 1999

Attest:

Q. TODD DICKINSON

*Attesting Officer*  *Acting Commissioner of Patents and Trademarks*